Dec. 24, 1963   R. A. KNIGHT   3,115,408
SINTERING PROCESSES
Filed Dec. 10, 1959
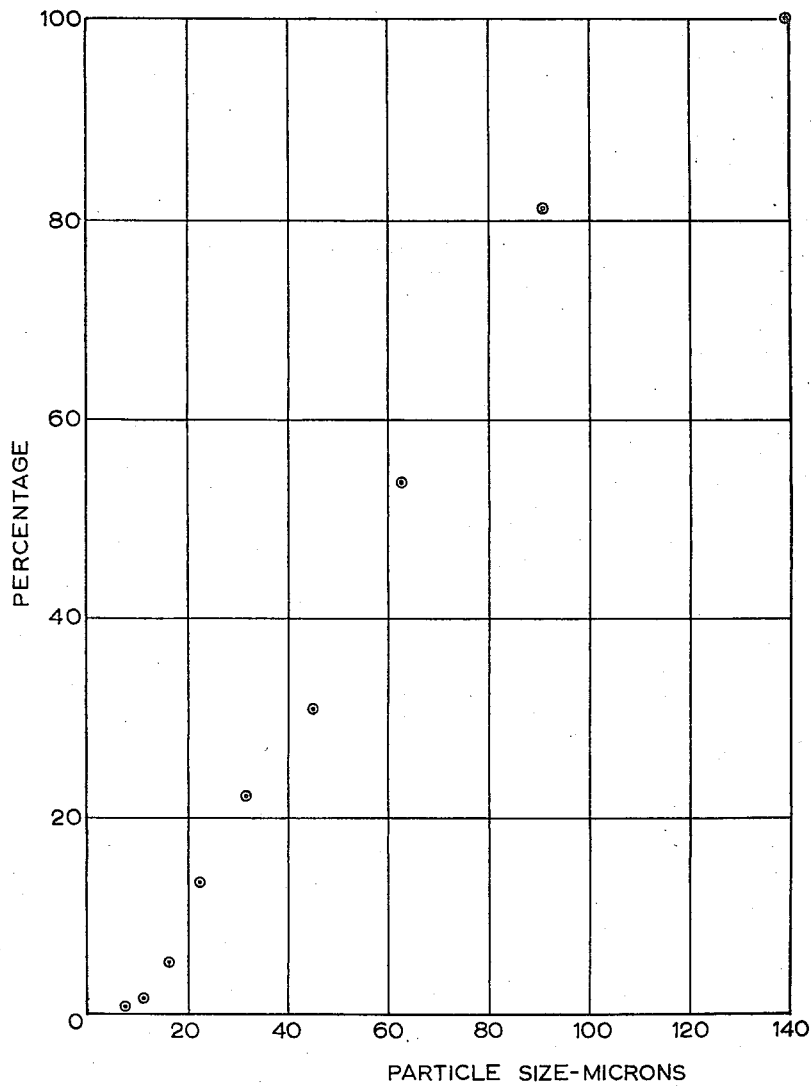
CUMULATIVE UNDERSIZE
BY WEIGHT
INVENTOR
RONALD ANDREW KNIGHT
BY

United States Patent Office 3,115,408
Patented Dec. 24, 1963

3,115,408
SINTERING PROCESSES
Ronald Andrew Knight, Newbury, England, assignor to the United Kingdom Atomic Energy Authority, London, England
Filed Dec. 10, 1959, Ser. No. 858,708
Claims priority, application Great Britain Dec. 22, 1958
4 Claims. (Cl. 75—200)

This invention relates to improvements in sintering processes, and relates particularly to the sintering of beryllium powder.

By means of the invention tubes can be produced substantially free from cracks or fissures. This is particularly important in beryllium tubes for use in nuclear fission reactors.

My British Patent 840,857 describes and claims a method of producing shaped bodies of beryllium which comprises filling loose beryllium powder into a mould and sintering the powder in the mould, no external pressure being applied to the mould before and during sintering. In that application a preferred particle size distribution of the beryllium is given. The distribution particularly preferred is 99.5% by weight below 200 mesh B.S.S., 85.9% below 240 mesh, 70–75% below 300 mesh and an average particle size of about 34–38 microns, the remainder of the particle size distribution curve approximating to a straight line between 300 mesh (53 microns) and zero.

This invention consists in a method of sintering uncompacted sinterable powders which comprises heating at a pre-sintering temperature an uncompacted mass of the powder in a mould until the mass has sufficient cohesion to maintain its shape when unsupported, and subsequently heating the mass at a sintering temperature above the pre-sintering temperature under conditions such that free contraction can occur.

As the temperature of a mass of sinterable powder is raised two distinct successive stages are reached, the dividing line between these stages being extremely indistinct. In the first stage the temperature is at a pre-sintering level at which the mass of powder begins to bind to a cohesive shape without any significant contraction. In the second stage the temperature is at a sintering level at which the mass of powder sinters and contracts.

For example, the following experimental sintering results were obtained with a beryllium powder having the particle size distribution shown in FIGURE 1 of the accompanying drawing:

[Percent density for various times at temperature, 100%=1.845]

| Sintering Temp. (° C.) | Time at Temperature (hours) | | | | | | | |
|---|---|---|---|---|---|---|---|---|
| | 0 | .75 | 2 | 4 | 6 | 8 | 12 | 18 |
| 1100 | | | | | | | 62.3 | |
| 1150 | | | | | 74.7 | 88.2 | 91.2 | |
| 1175 | | | 92.6 | 89.2 | 97.4 | 93.3 | 96.1 | |
| 1200 | 76.7 | 91.9 | 96.9 | 96.5 | 98.4 | 98.7 | 99.9 | 99.4 |
| 1225 | 90.2 | | 99.0 | 99.7 | 97.8 | 97.7 | | |
| 1250 | 93.5 | | 97.3 | 99.1 | 97.4 | | | |
| 1275 | 98.7 | | 95.5 | | 97.3 | | | |

It can be seen that the pre-sintering temperature for beryllium would be below approximately 1100° C. It has been found that the minimum pre-sintering temperature is above approximately 750° C. A preferred range for the pre-sintering temperature for beryllium is 930 to 1030° C. It can also be seen that the sintering temperature is above 1100° C. The main shrinkage occurs between 1100° and 1200° C. and the maximum sintering temperature is approximately 1275° C. where severe grain growth is initiated.

The substantially rigid mould used in the first stage of the method of the invention can be made of any suitable material. Its purpose is primarily to support the mass of powder until the mass can support itself. For example, the mould can be made of a metal or alloy which does not react unfavourably with the powder or which can be coated with an inert substance.

The conditions under which free contraction can occur can be achieved by removing, after the mass of powder has sufficient cohesion to support itself, the portions of the mould used to form cavities or chambers in the mass of powder, as, for example, the portions used to form the spaces between the fins of finned tubes. This removal is preferably achieved by melting the appropriate parts of a metal mould before any significant contraction occurs, provision being made either to drain the molten metal or to allow venting of the molten metal if it is not removed. For example, for the sintering of beryllium, the parts of the mould which are to be removed can be made of copper. Copper is a particularly suitable material for this purpose since its melting point, 1080° C., is extremely convenient.

By way of example, the production of a beryllium tube of length 9½", internal diameter 1.6" and wall thickness 0.125" will now be described.

A mould was made up from a graphite block, drilled to have a cavity oversize to diameter required on the sintered tube, and a copper tube placed centrally in the cavity. The copper tube, mounted inside a short locating graphite cylinder, had a coating of colloidal graphite and alumina (beryllia could be used instead) to prevent reaction between the beryllium and the copper.

The graphite block rested on a 2" thick refractory plate in a water-cooled brass vacuum chamber having a detachable water-cooled stainless steel lid from which suspended a high-frequency induction heating coil. The block was provided with an outer refractory sleeve of 1" wall thickness, and a refractory lid. Thermocouples were provided in the heating zone at the surface of the block of graphite to measure temperature.

The annular space between the copper tube and the graphite was loosely filled, under an argon atmosphere, with beryllium powder having a particle size distribution as in FIG. 1. The mould was then vibrated to increase the packing density of the powder. After this, a graphite tube was placed in the upper end of the annular space so as to close it and prevent any large loss of beryllium by vaporisation.

The pressure in the chamber was reduced to $10^{-4}$ mm., this being done slowly to prevent ejection of powder from the mould. The mould was then heated by high frequency induction to a pre-sintering temperature of 980° C. at a rate of 490° C. per hour, and held there for one hour, that is until the mass of powder had sufficient cohesion to maintain its shape in the second, following, stage of the method.

The temperature of the mould was raised rapidly to 1200° C. At 1080° C. the copper began to melt and was allowed to flow out of the bottom of the chamber into a chilled container for reclamation. The temperature of 1200° C. was maintained for six hours, at the end of which time the heating was discontinued and the mould allowed to cool.

It was noticed that there was small, if any, shrinkage of the original powder to the final length of sintered tube, that the internal diameter of the beryllium tube produced was closed to the original size of the copper tube used, and that the main shrinkage appeared to have taken place in wall thickness.

The carbon of the mould may react with certain metals, e.g. carbide spots may be noticed on the outside of sintered beryllium tubes. This can be cured by a mould dressing of alumina or beryllia.

I claim:

1. The method of producing a hollow metal article of substantially pure beryllium comprising providing mold means and a copper core within said mold means in spaced relation therewith, placing beryllium powder in an uncompacted state around the copper core and within the mold means, heating the mold means to a temperature in the range 750° C. and below the melting point of the copper core and maintaining the temperature for a period of time sufficient to bind the beryllium to a cohesive, self-supporting shape without contraction thereof, elevating the temperature of the mold means above the melting point of copper to effect the melting of the copper core, withdrawing the molten copper from the mold means and maintaining the temperature of the mold means in the range 1100° C.–1275° C. for a period of time sufficient to effect a complete sintering of the beryllium article.

2. A method in accordance with claim 1, wherein the hollow metal article is a substantially pure beryllium tube.

3. The method as claimed in claim 1 in which the temperature in the range about 750° C. and below the melting point of the copper is 930°–1030° C.

4. The method as claimed in claim 1 in which the temperature in the rang 1100° C.–1275° C. is 1100–1200° C.

References Cited in the file of this patent

UNITED STATES PATENTS

| | | |
|---|---|---|
| 2,227,308 | Hildabolt | Dc. 31, 1940 |
| 2,367,404 | Kott | Jan. 16, 1945 |

FOREIGN PATENTS

| | | |
|---|---|---|
| 573,740 | Great Britain | Dec. 4, 1945 |

OTHER REFERENCES

Atomic Energy Commission Document, BB–51, pages 29 and 30, published May 11, 1950.

"Powder Metallurgy in Nuclear Engineering," page 58, published by American Society for Metals, 1958.